US009676151B2

(12) United States Patent
Hadley et al.

(10) Patent No.: US 9,676,151 B2
(45) Date of Patent: Jun. 13, 2017

(54) BONDED REWORK TEMPLATE SYSTEM

(75) Inventors: Brent Louis Hadley, Kent, WA (US); Joseph Frank Floyd, University Place, WA (US); Patrick Jan Eames, Newcastle, WA (US); Christian Isaacs, Seattle, WA (US); Pradeep Krishnaswamy, Redmond, WA (US); Steven Donald Blanchard, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 922 days.

(21) Appl. No.: 13/109,163

(22) Filed: May 17, 2011

(65) Prior Publication Data

US 2012/0296460 A1   Nov. 22, 2012

(51) Int. Cl.
*G06F 17/50* (2006.01)
*B29C 73/10* (2006.01)
*B29K 105/06* (2006.01)

(52) U.S. Cl.
CPC .......... *B29C 73/10* (2013.01); *B29K 2105/06* (2013.01)

(58) Field of Classification Search
None
See application file for complete search history.

(56) References Cited

U.S. PATENT DOCUMENTS

| 6,174,392 | B1 | 1/2001 | Reis |
| 7,495,758 | B2 | 2/2009 | Walton |
| 2008/0055591 | A1 | 3/2008 | Walton |
| 2009/0112540 | A1 | 4/2009 | Kessel et al. |
| 2009/0112820 | A1 | 4/2009 | Kessel et al. |
| 2009/0112973 | A1 | 4/2009 | Kessel et al. |
| 2010/0274545 | A1 | 10/2010 | Greenberg et al. |
| 2010/0316458 | A1 | 12/2010 | Lindgren et al. |

FOREIGN PATENT DOCUMENTS

| WO | WO2008135856 A2 | 11/2008 |
| WO | WO2010147733 A1 | 12/2010 |
| WO | WO2011046686 A1 | 4/2011 |

OTHER PUBLICATIONS

PCT search report dated Sep. 24, 2012 regarding application PCT/US2012/033004, filing date Apr. 11, 2012, applicant The Boeing Company, 10 Pages.

Chu et al., "Internet-based Composite Repair", Journal of Composite Materials, 2005; 39; 827, pp. 1-20, http://jcm.sagepub.com/cgi/content/abstract/39/9/827.

Notices of Reasons for Rejection and English Translation, issued Feb. 16, 2016, regarding Japanese Patent Application No. 2014-511368, 13 pages.

State Intellectual Property Office of China Notification of the Decision of Rejection and English translation, regarding Application No. 2012800236742, issued Mar. 25, 2016, 21 pages.

(Continued)

*Primary Examiner* — Ryan Jarrett

(74) *Attorney, Agent, or Firm* — Yee & Associates, P.C.

(57) ABSTRACT

A method and apparatus for processing an inconsistency. A shape of the inconsistency is identified in a location having layers of composite materials. A model of the location is created with a portion of a number of layers in the layers of composite materials removed to form a section based on the shape of the inconsistency and a policy for rework.

18 Claims, 15 Drawing Sheets

(56) References Cited

OTHER PUBLICATIONS

Canadian Intellectual Property Office Examination Search Report, dated Dec. 8, 2015, regarding Application No. 2,825,404, 3 pages.
European Patent Office Communication, dated Jul. 11, 2016, regarding Application No. 12724423.4, 5 Pages.
Canadian Intellectual Property Office Office Action, regarding Application No. 2,825,404, 3 pages.
State Intellectual Property Office of China Notification of Reexamination and English translation, regarding Application No. 2012800236742, issued Dec. 7, 2016, 12 pages.
European Patent Office Communication, dated Mar. 10, 2017, regarding Application No. EP12724423.4, 3 pages.

FIG. 6

| | 602 606 | 608 | 610 | 612 | 614 |
|---|---|---|---|---|---|
| PLYINSERT | MATERIAL | THICKNESS | ORIENTATION | SEQUENCE | ROSSETTENAME |
| PLY P105 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | -45.000000 | SEQUENCE 700 | ROSETTE-ROSETTE SKIN |
| PLY P107 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 0.000000 | SEQUENCE 705 | ROSETTE-ROSETTE SKIN |
| PLY P112 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 45.000000 | SEQUENCE 720 | ROSETTE-ROSETTE SKIN |
| PLY P113 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 90.000000 | SEQUENCE 730 | ROSETTE-ROSETTE SKIN |
| PLY P115 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 0.000000 | SEQUENCE 735 | ROSETTE-ROSETTE SKIN |
| PLY P118 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 0.000000 | SEQUENCE 740 | ROSETTE-ROSETTE SKIN |
| PLY P119 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 45.000000 | SEQUENCE 750 | ROSETTE-ROSETTE SKIN |
| PLY P120 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | -45.000000 | SEQUENCE 760 | ROSETTE-ROSETTE SKIN |
| PLY P130 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 0.000000 | SEQUENCE 765 | ROSETTE-ROSETTE SKIN |
| PLY P134 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 45.000000 | SEQUENCE 770 | ROSETTE-ROSETTE SKIN |
| PLY P135 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 90.000000 | SEQUENCE 780 | ROSETTE-ROSETTE SKIN |
| PLY P136 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | -45.000000 | SEQUENCE 790 | ROSETTE-ROSETTE SKIN |
| PLY P137 | N0004763 I CARBON FIBER REINFORCED EPOXY SHEET PER BMS 8-276 TYPE 35 CLASS 11 GRADE 190 FORM 3 COMPOSITION LEVEL 2 I | 0.0076 | 45.000000 | SEQUENCE 800 | ROSETTE-ROSETTE SKIN |

| PLY NAME | MATERIAL | THICKNESS | ORIENTATION | SEQUENCE | ROSSETTE |
|---|---|---|---|---|---|
| PLY P011 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45 DEGREES | SEQUENCE 8 | ROSSETTE-Full_Barrel_Trans_Ros |
| PLY P050 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 90.000000 DEGREES | SEQUENCE 10 | ROSSETTE-Full_Barrel_Trans_Ros |
| PLY P058 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 11 | ROSSETTE-Full_Barrel_Trans_Ros |
| PLY P066 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 0.000 DEGREES | SEQUENCE 12 | ROSSETTE-Full_Barrel_Trans_Ros |
| PLY P153 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 0.000 DEGREES | SEQUENCE 67 | ROSSETTE-Full_Barrel_Trans_Ros |
| PLY P162 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 68 | ROSSETTE-Full_Barrel_Trans_Ros |
| PLY P179 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | -45.000 DEGREES | SEQUENCE 70 | ROSSETTE-Full_Barrel_Trans_Ros |
| PLY P225 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | -45.000 DEGREES | SEQUENCE 72 | ROSSETTE-Full_Barrel_Trans_Ros |
| PLY P242 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 74 | ROSSETTE-Full_Barrel_Trans_Ros |
| PLY P250 | 787 TOW (1/4)-N0004769\|CARBON FIBER REINFORCED EPOXY SHEET PER BMS 8-276 TYPE 35 CLASS 7 GRADE | 0.0076 | 0.000 DEGREES | SEQUENCE 75 | ROSSETTE-Full_Barrel_Trans_Ros |

FIG. 12

| PLY NAME | MATERIAL | THICKNESS | ORIENTATION | SEQUENCE | ROSSETTE |
|---|---|---|---|---|---|
| PLY P011 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45 DEGREES | SEQUENCE 8 | ROSSETTE-Full_Barrel_Trans_Ros |
| PLY P050 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 90.000000 DEGREES | SEQUENCE 10 | ROSSETTE-Full_Barrel_Trans_Ros |
| PLY P058 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 11 | ROSSETTE-Full_Barrel_Trans_Ros |
| PLY P066 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 0.000 DEGREES | SEQUENCE 12 | ROSSETTE-Full_Barrel_Trans_Ros |
| PLY P153 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 0.000 DEGREES | SEQUENCE 67 | ROSSETTE-Full_Barrel_Trans_Ros |
| PLY P162 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 68 | ROSSETTE-Full_Barrel_Trans_Ros |
| PLY P179 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | -45.000 DEGREES | SEQUENCE 70 | ROSSETTE-Full_Barrel_Trans_Ros |
| PLY P225 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | -45.000 DEGREES | SEQUENCE 72 | ROSSETTE-Full_Barrel_Trans_Ros |
| PLY P242 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 45.000 DEGREES | SEQUENCE 74 | ROSSETTE-Full_Barrel_Trans_Ros |
| PLY P250 | 787 TOW (1/4)-N0004769\|CARBON FIBER REINFORCED EPOXY SHEET PER BMS 8-276 TYPE 35 CLASS 7 GRADE 190 FORM 3 COMPOSITION LEVEL 2\| | 0.0076 | 0.000 DEGREES | SEQUENCE 75 | ROSSETTE-Full_Barrel_Trans_Ros |

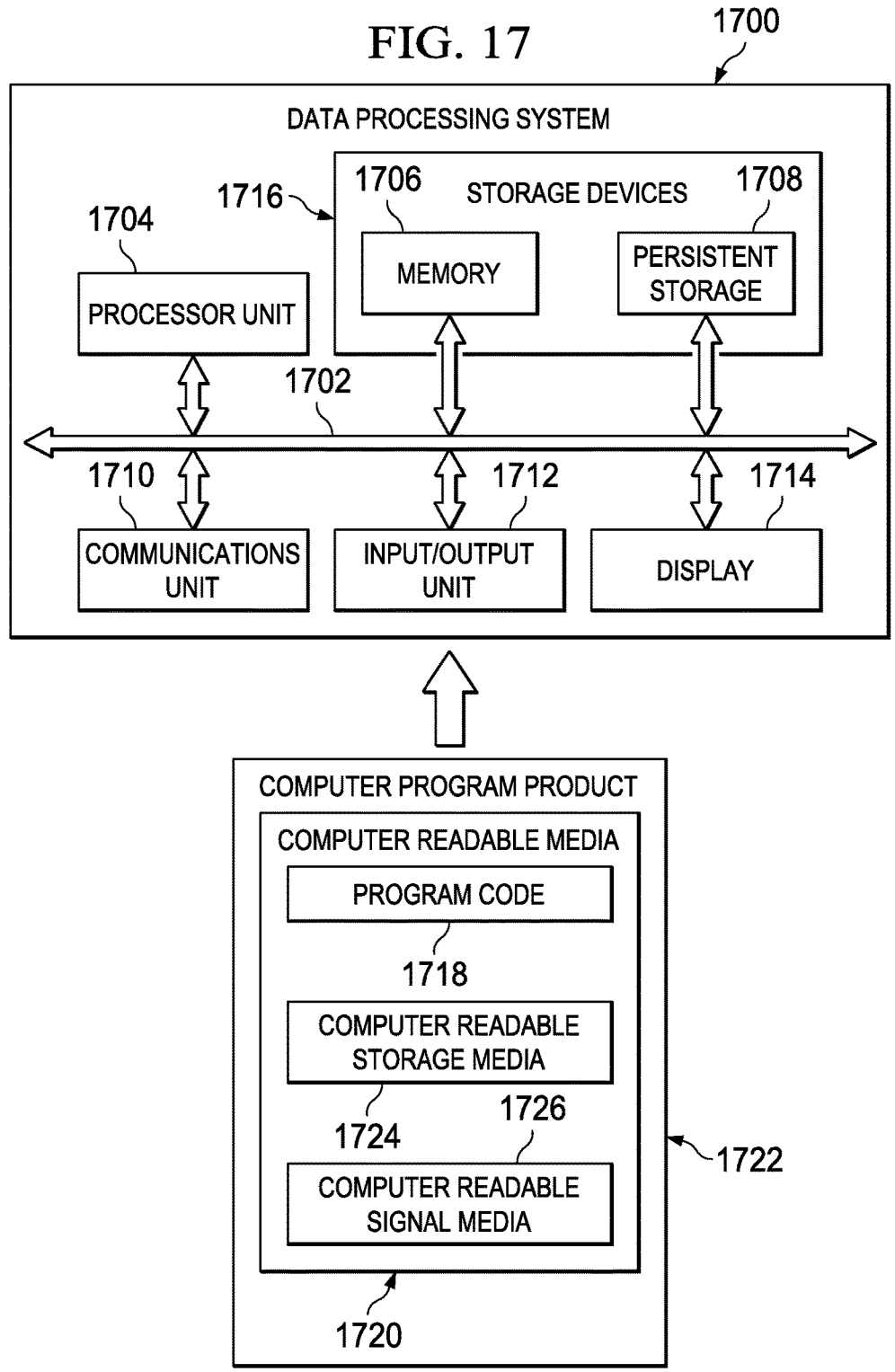

BONDED REWORK TEMPLATE SYSTEM

BACKGROUND INFORMATION

1. Field

The present disclosure relates generally to aircraft and, in particular, to a method and apparatus for performing rework on an aircraft. Still more particularly, the present disclosure relates to a method and apparatus for generating a template to form a scarf for bonded rework.

2. Background

Aircraft are being designed and manufactured with greater and greater percentages of composite materials. Some aircraft may have more than 50 percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing, or stabilizer sections joined to form a stabilizer.

In forming these components, layers of composite materials may be laid up and cured to form structures for an aircraft. During manufacturing and/or use, inconsistencies may occur in various structures of the aircraft. These inconsistencies may be undesirable and/or may result in less than desired performance of the aircraft.

For example, inconsistencies may occur in composite structures. These inconsistencies may include, for example, without limitation, delamination, voids in or between layers of composite materials, cracks, deformations in the structure, and/or other types of inconsistencies.

When an inconsistency is identified on a composite structure in an aircraft, the structure may be reworked to remove the inconsistency. A rework may involve removing a portion of the composite materials in a section of the composite structure and placing new composite materials into that section. For example, a number of layers of composite material corresponding to the layers of composite material removed in the section may be used as a patch. This patch may be bonded to the section to perform the rework. These operations may be referred to as bonded rework for the aircraft.

Information is obtained about the layers of composite material in the location where the inconsistency is located. This information is obtained to identify layers of material for a patch. This patch is put in place of a section of layers of composite material containing the inconsistency that is removed from the structure. Obtaining this information is often time consuming. Further, identifying the portion of the composite materials to be removed to form a section for which the patch may be placed also may be more time consuming than desired.

Therefore, it would be advantageous to have a method and apparatus that takes into account one or more of the issues discussed above, as well as possibly other issues.

SUMMARY

In one illustrative embodiment, a method is provided for processing an inconsistency. A shape of the inconsistency is identified in a location having layers of composite materials. A model of the location is created with a portion of a number of layers in the layers of composite materials removed to form a section based on the shape of the inconsistency and a policy for rework.

In another illustrative embodiment, an apparatus comprises a computer system. The computer system is configured to identify a shape of an inconsistency in a location having layers of composite materials and create a model of the location with a portion of a number of layers in the layers of composite materials removed to form a section based on a shape of the inconsistency and a policy for rework.

In yet another illustrative embodiment, a computer program product comprises a computer readable storage medium, first program code, and second program code. The first program code is for identifying a shape of an inconsistency in a location having layers of composite materials. The second program code is for creating a model of the location with a portion of a number of layers in the layers of composite materials removed to form a section based on the shape of the inconsistency and a policy for rework. The first program code and the second program code are stored on the computer readable storage medium.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 6 is an illustration of layup information for layers of composite materials in accordance with an illustrative embodiment;

FIG. 9 is an illustration of information for layers of composite material in accordance with an illustrative embodiment;

FIG. 12 is an illustration of a display of layup information for layers of composite material in a fuselage in accordance with an illustrative embodiment;

FIG. 17 is an illustration of a data processing system in accordance with an illustrative embodiment.

DETAILED DESCRIPTION

Figure 1:
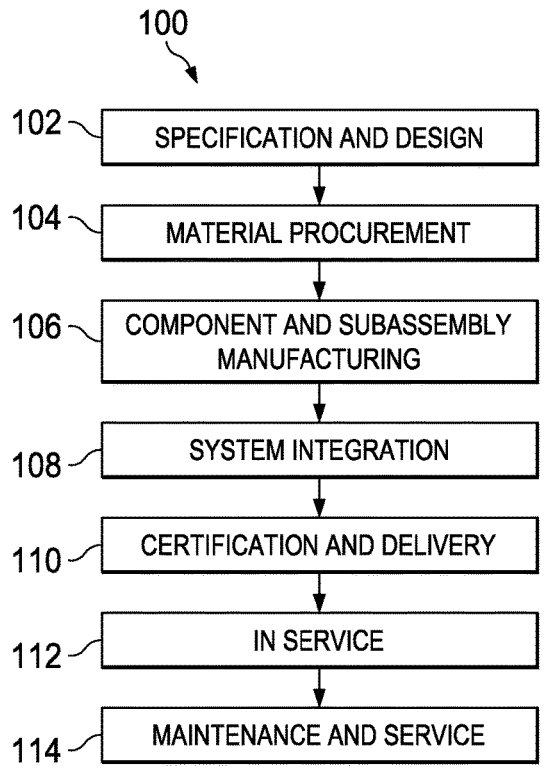
FIG. 1 is an illustration of an aircraft manufacturing and service method in accordance with an illustrative embodiment.
Figure 2:
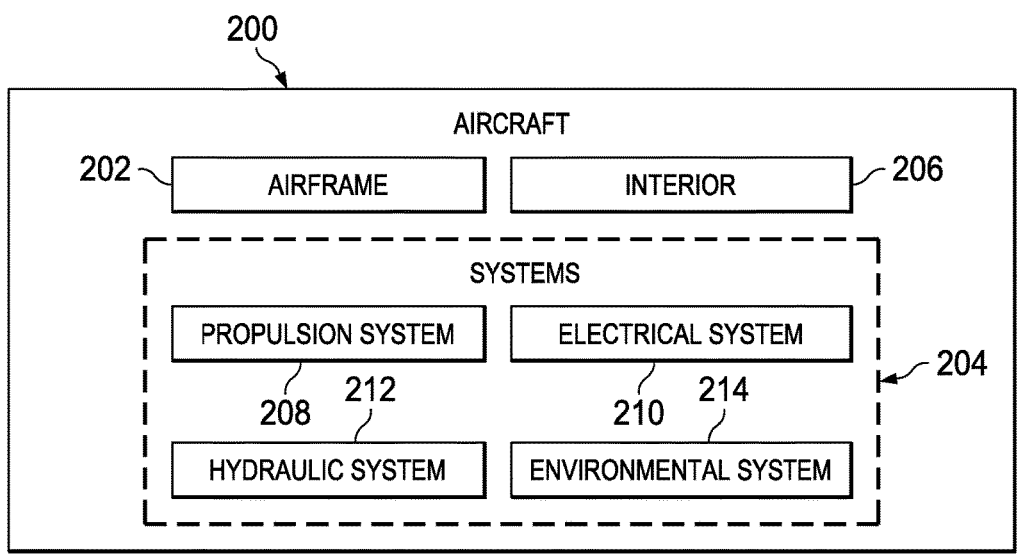
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

For example, one or more of the illustrative embodiments may be applied during component and subassembly manufacturing 106 to rework inconsistencies that may be found in composite structures. As yet another example, one or more of the illustrative embodiments may be used during maintenance and service 114 to rework inconsistencies that may have occurred during use of aircraft 200.

The different illustrative embodiments recognize and take into account a number of different considerations. For example, without limitation, the different illustrative embodiments recognize and take into account that in performing rework on composite structures, a maintenance person may need to identify a portion of a number of layers in the layers of composite materials to remove to form a section. This section is also referred to as a scarf.

The section may have a stair-stepped cross section such that different layers are exposed when the area is viewed from a top view. The exposed layers may provide a surface for bonding a patch with layers in the section.

The different illustrative embodiments recognize and take into account that the shape for this section encompasses the inconsistency that is to be reworked to remove or reduce the inconsistency. The different illustrative embodiments also recognize and take into account that various policies may be present for which layers are to be removed for the layers of composite materials and the amount of each layer to be removed to form a section.

For example, the different illustrative embodiments recognize and take into account that an angle or ratio of layers may be required. For example, the section may require a ratio of about a 30 to 1 ratio. This ratio means that for every inch deep into the composite structure, the area should extend out about 30 inches.

The different illustrative embodiments recognize and take into account that various features or other structures around the inconsistency may make it difficult to obtain a desired ratio for the section. Further, the thickness of the composite materials may make obtaining a desired ratio difficult.

The different illustrative embodiments recognize and take into account that these variations and features in the structure and the thickness of the composite material may require additional research and time on the part of the maintenance person. The different illustrative embodiments also recognize and take into account that information about the different layers of composite material is not easily found.

For example, an identification of the layers may be found in a computer aided design model of the aircraft. The composition, orientation, and other information about the layers may be found in yet a different database or repository. This information may be located in a repository for computer numerical controlled machines that lay up composite materials. The different illustrative embodiments recognize and take into account that locating this information may be more time consuming than desired.

Therefore, the different illustrative embodiments provide a method and apparatus for processing an inconsistency. In one illustrative embodiment, a shape of the inconsistency in a location having layers of composite materials is identified. A model of the location is created with a portion of the number of layers in the layers of composite material removed to form a section based on the shape of the inconsistency and a policy for the rework.

Information for a layup for the layers of the composite materials may be identified based on the shape of the inconsistency and the location of the inconsistency. The model and this information may be used to generate information to perform the rework on the inconsistency. This type of information may be referred to as a template.

Figure 3:
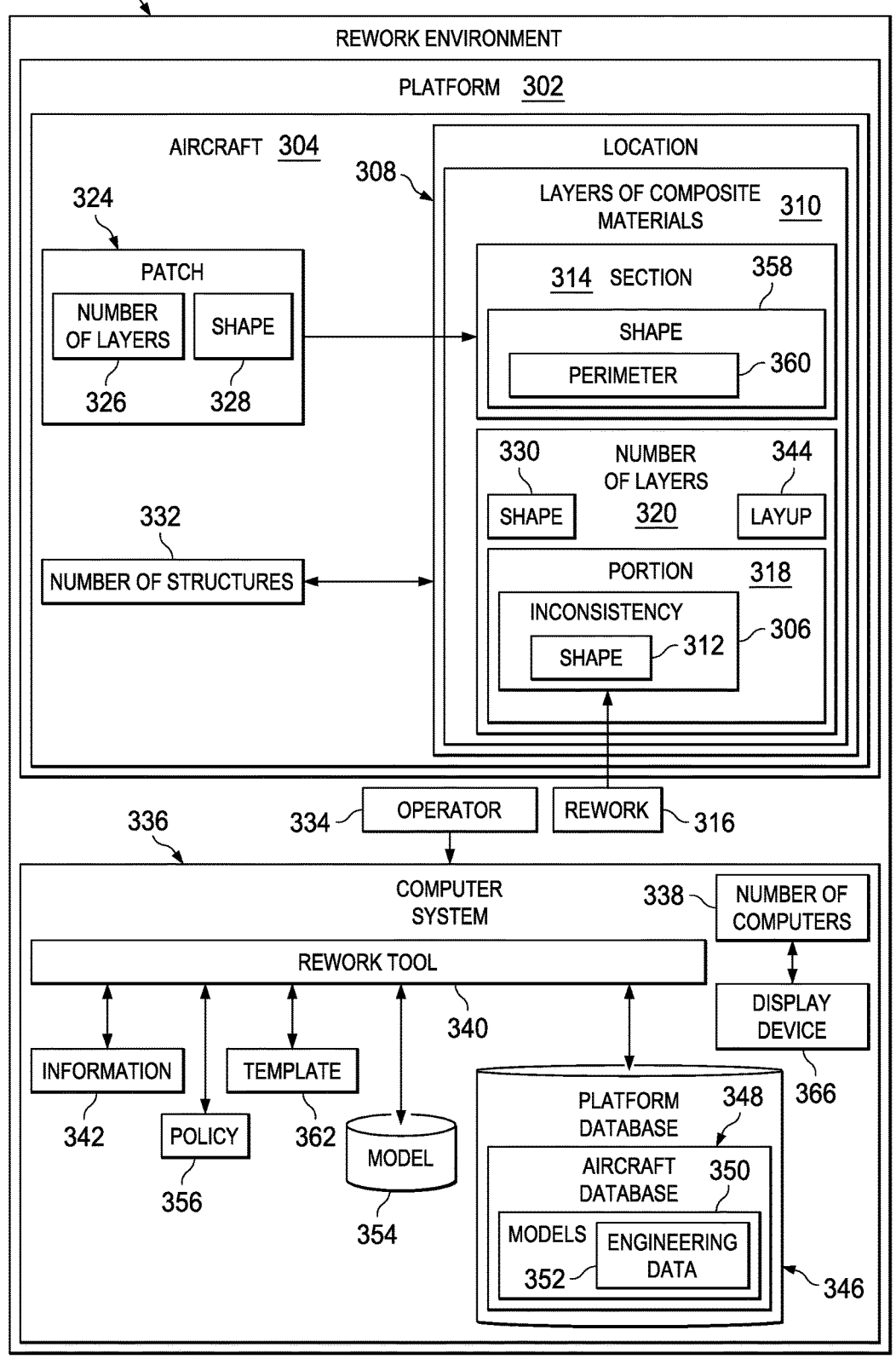
FIG. 3 is an illustration of a rework environment in accordance with an illustrative embodiment.

With reference now to FIG. 3, an illustration of a rework environment is depicted in accordance with an illustrative embodiment. Rework environment 300 is an example of an environment in which rework may be performed on platform 302. In this illustrative example, platform 302 may take the form of aircraft 304. Aircraft 304 may be an example of aircraft 200 in FIG. 2.

In this illustrative example, inconsistency 306 may be located in location 308 of aircraft 304. Layers of composite materials 310 are present in location 308 in which inconsistency 306 is present. Inconsistency 306 has shape 312 in layers of composite materials 310.

In performing rework 316 on inconsistency 306, portion 318 of number of layers 320 within layers of composite materials 310 are removed. Portion 318 of number of layers 320 includes or substantially includes inconsistency 306. By removing portion 318 of number of layers 320 in layers of composite materials 310, inconsistency 306 may be removed and/or reduced. This removal of portion 318 of number of layers 320 forms section 314, which may be referred to as a scarf.

Patch 324 is placed into section 314 after section 314 is formed. Patch 324 is bonded to section 314 as part of performing rework 316.

Patch 324 may have number of layers 326 of composite material that corresponds to number of layers 320 of layers of composite materials 310. In other words, a layer within number of layers 320 of layers of composite materials 310 may be the same type of layer in a layer within number of layers 320. Further, in these illustrative examples, the orientation of the layers in patch 324 also may correspond to number of layers 320.

The orientation of number of layers 320 removed to form section 314 may have different orientations. Each layer within number of layers 320 may have an orientation that is selected to obtain a particular property or properties. For example, the orientation may be selected to provide properties, such as a desired strength, durability, and other suitable features.

Depending on the orientation of the layer within number of layers 320, different properties may be present. When rework 316 is performed, it is often desirable for number of layers 326 in patch 324 to have the same type of orientation as number of layers 320 in portion 318 that was removed to form section 314. This matching of orientations for layers is performed to obtain the same properties as the layers that are removed.

When the layers are removed, some overlap between the original layers still remaining and the layers that are in patch 324 are desirable. In other words, each layer in number of layers 326 for patch 324 matches layers within number of layers 320 in section 314. Further, a layer in number of layers 326 may partially overlap an original layer in number of layers 320 in section 314. Thus, the layers have the same orientation, thickness, and materials as the layers removed in these illustrative examples.

Patch 324 has shape 328 that substantially corresponds to shape 330 of portion 318 that was removed. In other words, shape 328 may be substantially the same as shape 330. Thus, shape 328 for patch 324 is selected to be substantially the same shape, shape 330, as that of number of layers 320 that were removed to form section 314.

In this manner, patch 324 may replace portion 318 of number of layers 320 in layers of composite materials 310 that was removed to form section 314. Patch 324 may be bonded in place to perform rework 316 on inconsistency 306. Rework 316 reduces or removes inconsistency 306.

In these illustrative examples, number of structures 332 may be associated with location 308. Number of structures 332 is considered to be associated with location 308 by including location 308, being adjacent to location 308, and/or being located within some distance of location 308 such that number of structures 332 may affect and/or be affected by bonding of patch 324 in section 314. Number of structures 332 may affect the formation of section 314.

In these illustrative examples, location 308 may be identified by operator 334. Location 308 may take the form of coordinates, measurements, and/or other information used to identify location 308. Operator 334 may be, for example, without limitation, a maintenance person, a technician, a pilot, or some other person. Operator 334 may input location 308 into computer system 336.

Computer system 336 takes the form of number of computers 338 in these illustrative examples. When more than one computer is present in number of computers 338, these computers may be networked or otherwise in communication with each other. In the illustrative examples, rework tool 340 runs on computer system 336. Rework tool 340 may take the form of hardware, software, or a combination of the two.

Rework tool 340 uses location 308 and shape 312 of inconsistency 306 to identify information 342 for layup 344 for number of layers 320 of layers of composite materials 310. Additionally, information 342 also may include other information. For example, information 342 may include information for other layers in layers of composite materials 310 in addition to number of layers 320. As another illustrative example, information 342 may include information about number of structures 332. Information 342 also may be used to design, select, and/or manufacture patch 324.

Information 342 may be identified using platform database 346. Platform database 346 may include, for example, without limitation, aircraft database 348. Aircraft database 348 includes models 350. Models 350 include engineering data 352 in the depicted examples. Models 350 may be, for example, computer aided designs and/or other types of models for aircraft 304 within aircraft database 348.

Engineering data 352, in these depicted examples, may include, for example, without limitation, information about number of structures 332, layup 344, and/or other suitable types of information. As another example, engineering data 352 may include information about platform 302 used to generate patch 324.

In these illustrative examples, rework tool 340 creates model 354 of location 308. Rework tool 340 removes portion 318 of number of layers 320 in layers of composite materials 310 in model 354 to form section 314. Model 354 is generated based on shape 312 of inconsistency 306 and policy 356.

As depicted, rework tool 340 identifies shape 358 and, in particular, one parameter for shape 358 is a configuration of perimeter 360 based on shape 312 of inconsistency 306 and policy 356. Shape 358 of section 314 has perimeter 360 from a top view of section 314 in model 354. Rework tool 340 also may select other parameters for shape 358, such as a depth for section 314.

Rework tool 340 may select shape 358 and, in particular, perimeter 360, to have a form also based on number of structures 332 and their effect on forming section 314. In other words, perimeter 360 may have an irregular shape rather than a regular or standard shape. This irregular shape may be referred to as an amoeba or random shape.

Perimeter 360 also may be defined for each layer in number of layers 320 that is removed to form section 314. As a result, rework tool 340 may define a shape of perimeter 360 for each layer to be removed to be different from another layer in number of layers 320. With this selection, the angle or ratio of layers may vary around perimeter 360 as selected for section 314.

In this manner, a more effective form of patch 324 may be created. Thus, selection of shape 358 by rework tool 340 may allow for rework 316 to occur rather than replacing a component. For example, if too much material is removed from layers of composite materials, the component may have to be replaced instead of performing rework 316. With an irregular shape, the amount of composite material removed may allow for rework 316 instead of replacing the component.

In the illustrative examples, an irregular shape for shape 358 may be present if the inconsistency is at a discrete location and no ply drops are in the area in which rework 316 is to occur. However, inconsistency 306 may vary in length and depth. Further, multiple inconsistencies may be present within a particular area in which different inconsistencies have different depths, shapes, and/or sizes. These types of inconsistencies may result in an irregular shape for shape 358. Additionally, if ply drops are asymmetric in location 308, shape 358 also may have an irregular shape.

Further, rework tool 340 also may identify where layers begin and end within layers of composite materials 310 in location 308. For example, a layer may be on the same level as another layer within layers of composite materials 310.

Further, with an irregular shape, more of the composite materials in layers of composite materials 310 may be left in place instead of being removed. In this manner, portion 318 of number of layers 320 may be made smaller as compared to using some regular shapes, such as a circle, a track, or some other type of shape.

Also, with an irregular shape, number of structures 332 associated with location 308 may be taken into account. For example, with a shape, such as a circle, number of structures 332 may be harder to take into account if the circle encompasses one or more of number of structures 332. With the irregular shape, perimeter 360 may exclude number of structures 332 if needed.

Policy 356 comprises a number of rules and may also include data used to apply the number of rules. Policy 356 defines how section 314 is to be created. Policy 356 also may define how patch 324 is to be designed, selected, and/or manufactured.

For example, policy 356 may provide rules for shape 358 of section 314. For example, without limitation, policy 356 may define how many layers are present in number of layers 320 and the size of each layer in number of layers 320 for removal from layers of composite materials 310. The size is an area of a layer that is removed from the layer.

Additionally, policy 356 also may include rules that select parameters, such as, for example, without limitation, scarf ratio, variable scarf ratios in areas, and other suitable types of rules. For example, a scarf ratio of 30:1 is typically used for rework 316. This type of ratio, however, may be impracticable for some areas. As a result, the scarf ratio may change from 30:1 from part of section 314 to 20:1 at another part of section 314. This change or variation in the scarf ratio is referred to as a variable scarf ratio.

The change in the scarf ratio may allow removing less of number of layers 320 in forming section 314. As a result, the size of section 314 may be reduced. Rework tool 340 may allow for this variable scarfing and better visualization of the scarfing in section 314 in a manner that may not be possible without rework tool 340. These views may be provided in the displays described with respect to FIGS. 5-13 below.

As another example, policy 356 may include rules that identify areas to avoid in removing number of layers 320. These areas may include structures that should be avoided, such as number of structures 332. With these types of rules, perimeter 360 of section 314 may have an irregular shape when avoiding those types of areas. Further, policy 356 also may define when replacement of a component should occur instead of rework 316.

Additionally, policy 356 may identify a ratio and/or angle for a cross section of section 314. As a further example, policy 356 also may identify exceptions or different configurations for shape 358 of section 314 based on number of structures 332 that may be associated with location 308. These and other rules in policy 356 may be generated from at least one of regulations of a government or regulatory authority, guidelines from a manufacturer of aircraft 304, and/or some other suitable source.

Rework tool 340 generates template 362. Template 362 is generated by rework tool 340 using model 354. Rework tool 340 also may use other information in creating template 362. For example, information 342 for layup 344 for number of layers 320 may be used to form template 362.

Template 362 is a data structure that includes the information used by operator 334 to perform some or all of rework 316 on inconsistency 306. This data structure may be, for example, a file, a number of files, a database, a record in a database, or some other suitable data structure.

In these illustrative examples, template 362 may be viewed on computer system 336 by operator 334 to perform rework 316 on inconsistency 306. In particular, template 362 may be displayed on display device 366 in computer system 336.

In essence, template 362 is used by operator 334 to perform operations for rework 316 on inconsistency 306. For example, template 362 provides information to remove portion 318 of number of layers 320 in layers of composite materials 310. Further, template 362 also may provide information to form patch 324 and/or place patch 324 into section 314 to perform rework 316 on inconsistency 306 at location 308.

In this manner, operator 334 may perform rework 316 in less time, as compared to current rework operations without one or more of the different illustrative embodiments. In this manner, time and expense for maintenance operations on aircraft 304 based on inconsistency 306 may be reduced.

The illustration of rework environment 300 in FIG. 3 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in different illustrative embodiments, additional inconsistencies in addition to inconsistency 306 may be present in location 308 or other locations. These inconsistencies may be processed in the same manner as inconsistency 306. In yet another illustrative example, other operators in addition to operator 334 may be present. For example, operator 334 may locate inconsistency 306, while another operator inputs the information into computer system 336. In still other examples, another operator may perform rework 316 once template 362 has been generated. In yet another illustrative example, operator 334 may use model 354 instead of template 362.

Figure 4:
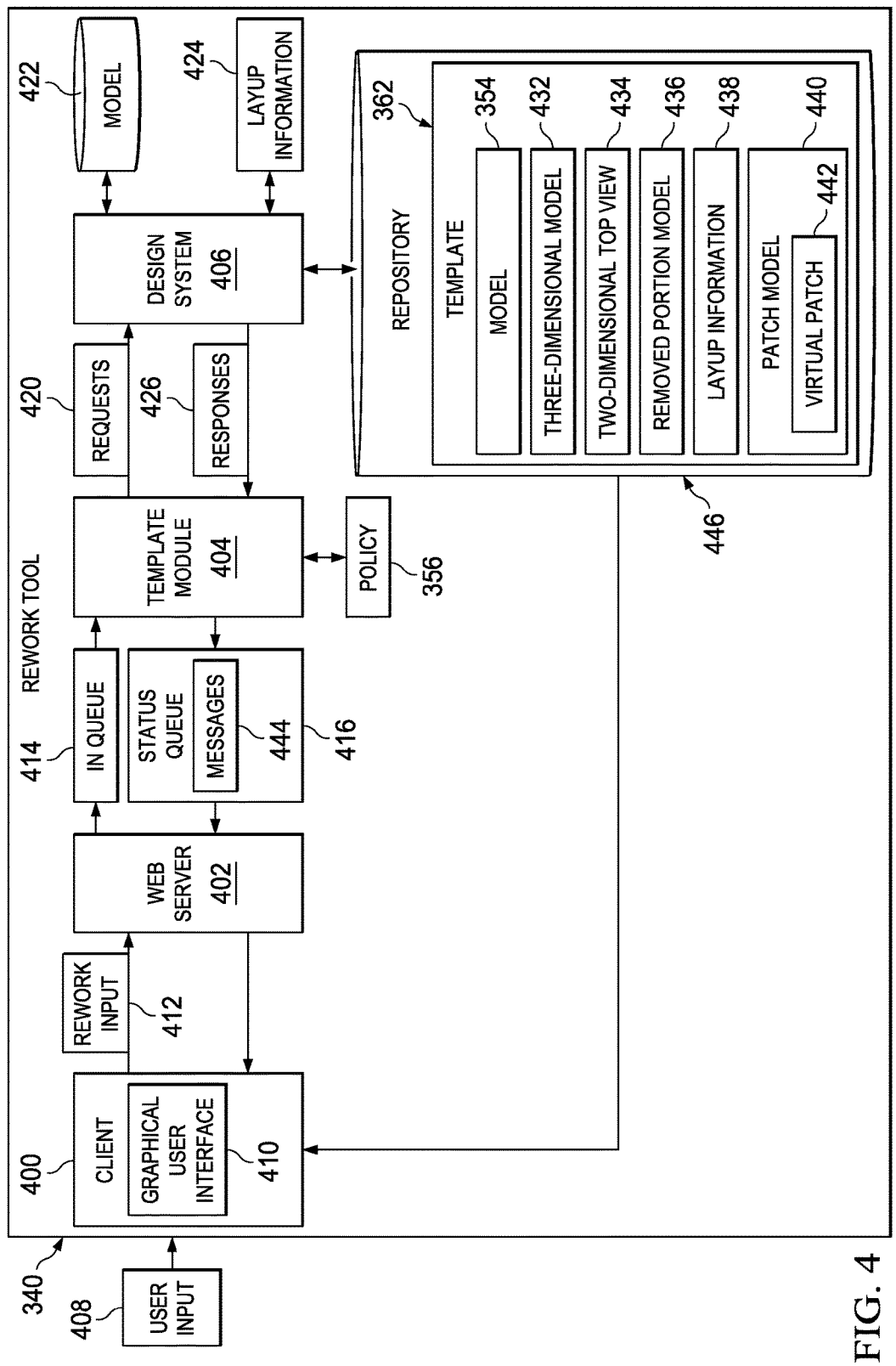
FIG. 4 is an illustration of components in a rework tool in accordance with an illustrative embodiment.

With reference now to FIG. 4, an illustration of components in a rework tool is depicted in accordance with an illustrative embodiment. In this depicted example, components for rework tool 340 are depicted.

In this illustrative example, rework tool 340 includes client 400, web server 402, template module 404, and design system 406. All of these components may run on one or more computers within computer system 336 in FIG. 3.

In this illustrative example, client 400 is a portion of rework tool 340 that receives user input 408 using graphical user interface 410. Client 400 may be a browser application or some other suitable application.

User input 408 is entered by operator 334 in FIG. 3 using graphical user interface 410 in these depicted examples. In some examples, user input 408 may be sent to client 400 without graphical user interface 410 if user input 408 is sent by an application, computer, or other device.

User input 408 includes information used to define section 314 to perform rework 316 in FIG. 3. Also, the information may include information needed to design, select, and/or manufacture patch 324 in FIG. 3. The information may be, for example, location 308 and shape 312 for inconsistency 306. Additionally, user input 408 may include an identification of aircraft 304 and other suitable information. This user input may take the form of text, values, images, and other types of input.

In this example, client 400 may take the form of a web-based client. For example, client 400 may be implemented using a browser on which web pages with forms and pages are displayed on display device 366 within computer system 336 in FIG. 3. Graphical user interface 410 receives user input 408 and displays information to a user.

User input 408 may be formatted, processed, validated, and/or otherwise processed by client 400 to form rework input 412. Client 400 sends rework input 412 to web server 402.

Web server 402 is a process in computer system 336 that receives rework input 412 from clients, such as client 400. Additionally, web server 402 may receive rework input 412 from other clients or the same client in computer system 336. Rework input 412 is placed into queue 414. Additionally, web server 402 also may monitor status queue 416 for messages 444. Any of messages 444 in status queue 416 may then be sent to client 400 for display in graphical user interface 410.

In these illustrative examples, template module 404 monitors in queue 414 for rework input 412. When rework input 412 is found in in queue 414, rework input 412 is processed by template module 404 to generate template 362.

In these illustrative examples, template module 404 sends requests 420 to design system 406 to access model 422. Model 422 is a model for a platform for which rework input 412 is generated. Although requests 420 are plural, requests 420 also may refer to a single request. Design system 406 may be, for example, without limitation, a computer aided design application. For example, design system 406 may be Catia, which is available from Dassault Systemes. Of course, design system 406 may be implemented using any available design application or software.

Template module 404 sends requests 420 to design system 406 to load model 422. After model 422 has been loaded, template module 404 sends requests 420 to design system 406 to identify layup information 424. Layup information 424 may be returned to template module 404 in responses 426. Layup information 424 is information about layup 344 for number of layers 320 in portion 318 removed to form section 314 in FIG. 3.

Additionally, template module 404 may send requests 420 to design system 406 to generate model 354. Model 354 is a model of layers of composite materials 310 in FIG. 3 in which inconsistency 306 is located.

Template module 404 sends requests 420 to design system 406 to remove portion 318 of number of layers 320 in layers of composite materials 310 from model 354. In response, design system 406 modifies model 354. Portion 318 and number of layers 320 are identified based on shape 312 of inconsistency 306 and the location of inconsistency 306 within location 308 and the use of policy 356. Additionally, this removal of portion 318 also may take into account number of structures 332 associated with location 308.

Template module 404 may then send requests 420 to design system 406 to create template 362 from model 354. Template 362, in this illustrative example, may be a form of model 354. For example, without limitation, template 362 may include at least one of three-dimensional model 432, two-dimensional top view 434, removed portion model 436, layup information 438, patch model 440, and/or other suitable models or information.

Three-dimensional model 432 is a model of location 308 with portion 318 of number of layers 320 and layers of composite materials 310 removed to form section 314. In other words, three-dimensional model 432 is a model of a scarf that is formed. Two-dimensional top view 434 provides a top view of section 314 in these examples.

In this manner, a layup and orientation of layers may be seen. In some cases, the orientation of layers also may indicate two-dimensional top view 434.

Removed portion model 436 is a model formed using number of layers 320 in layers of composite materials 310 removed to form section 314. In other words, removed portion model 436 shows portion 318. This model may also be a three-dimensional model. Layup information 438 may provide information about the different layers.

Patch model 440 may include a model of a patch for use in performing rework. Patch model 440 may be a model of patch 324 that is to be placed into section 314 in these illustrative examples. Patch model 440 illustrates virtual patch 442 that may be used to construct a physical patch, such as patch 324.

Thereafter, when template 362 is complete, template module 404 stores template 362 in repository 446 in the depicted examples. Repository 446 is one or more storage systems in which one or more storage devices are present. Repository 446 may be a database or some other repository in which template 362 may be stored for access by client 400.

Template module 404 then places messages 444 into status queue 416. Messages 444 indicate that template 362 has been completed.

Web server 402 monitors status queue 416. When messages 444 are detected in status queue 416, web server 402 sends messages 444 to client 400. Messages 444 indicate that template 362 is ready. Messages 444 may include, for example, a universal resource locator that points to a location of template 362. The user may then retrieve template 362 for display on graphical user interface 410. This retrieval may be directly from repository 446 in these examples.

The different components illustrated for rework tool 340 in FIG. 4 may be combined with components in FIG. 3, used with components in FIG. 3, or a combination of the two. Additionally, some of the components in the figure may be illustrative examples of how components shown in block form in FIG. 3 may be implemented.

The illustration of the components for rework tool 340 in FIG. 4 is not meant to imply architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, the different processes illustrated for client 400, web server 402, and template module 404 may be implemented on more than one computer. In still other illustrative examples, the different operations performed by design system 406 may be performed directly by template module 404 instead. Of course, other combinations of components or division of operations may be implemented for an illustrative embodiment. In still other illustrative examples, the different operations performed by template module 404 may be integrated as part of design system 406.

In the depicted examples, only client 400 is shown. In other examples, one or more additional clients may be used and may send rework input to web server 402. As another illustrative example, three-dimensional model 432, removed portion model 436, and patch model 440 may all be a single model instead of three different models.

FIGS. 5-13 are illustrations of displays in graphical user interface 410. These displays are examples of information from template 362 that may be displayed by graphical user interface 410 in client 400 in FIG. 4. The different displays show information that may be used to perform rework 316 in FIG. 3.

Figure 5:
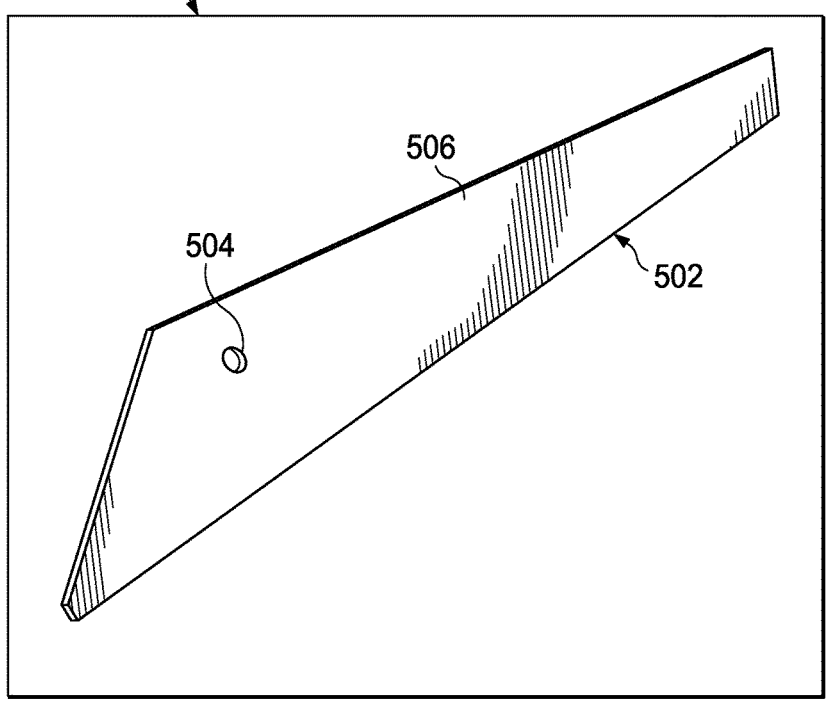
FIG. 5 is an illustration of a section in a skin panel for a wing in accordance with an illustrative embodiment.

With reference first to FIG. 5, an illustration of a section in a skin panel for a wing is depicted in accordance with an illustrative embodiment. In this illustrative example, display 500 is an example of a display in graphical user interface 410 for client 400.

As depicted, skin panel 502 is used with a wing on an aircraft and is shown in display 500. In this illustrative example, section 504 can be seen on surface 506 of skin panel 502. In this example, skin panel 502 may be manipulated by a user in display 500. For example, a user may rotate skin panel 502, magnify skin panel 502, and/or perform other manipulations of skin panel 502 within display 500. In other words, skin panel 502 is displayed and may be manipulated as a three-dimensional object.

With reference now to FIG. 6, an illustration of layup information for layers of composite materials is depicted in accordance with an illustrative embodiment. In this illustrative example, display 600 is an example of a display that may be generated by graphical user interface 410 for client 400 in FIG. 4.

As depicted, display 600 includes table 602. Table 602 is an example of layup information 424 in FIG. 4.

Column 604 in table 602 identifies the name of the layer. Column 606 identifies the material in the layer. Column 608 identifies a thickness, column 610 identifies an orientation of the material in the layer, and column 612 identifies a sequence for the layer. Column 614 provides a rosette name. The rosette name is the identification of the axis system for the layer.

Figure 7:
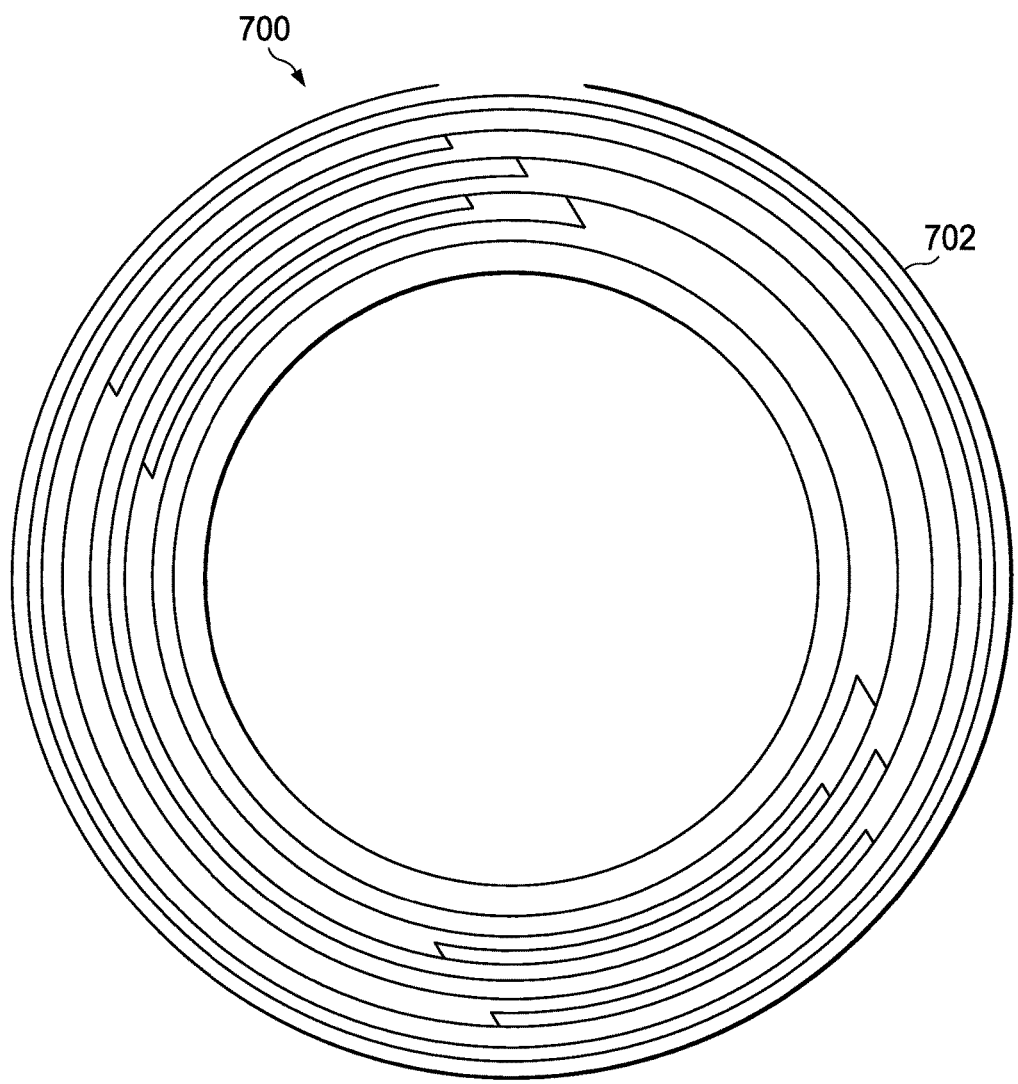
FIG. 7 is an illustration of a two-dimensional top view of a section in a skin panel in accordance with an illustrative embodiment.

With reference now to FIG. 7, an illustration of a two-dimensional top view of a section in a skin panel is depicted in accordance with an illustrative embodiment. In this illustrative example, display 700 is another example of the display in graphical user interface 410 for client 400. In this illustrative example, section 702 is a two-dimensional view of section 504 in FIG. 5. Section 702 is a top view from surface 506 of skin panel 502 in FIG. 5. In this illustrative example, section 702 has a circular shape.

In the depicted examples, information in FIGS. 5-7 may be linked to each other. For example, selection of an entry in table 602 in display 600 in FIG. 6 may cause graphical user interface 410 to show display 700 with an indication of the layer in section 702 that corresponds to the selected entry in table 602. As another example, selection of a layer in section 702 may cause graphical user interface 410 to show display 600 and indicate the entry that corresponds to the selected layer.

The indications may occur in a number of different ways. For example, an indication may be made with a graphical indicator in association with the entry in table 602. The graphical indicator may be at least one of highlighting the entry, bolding text, animation, color, and/or other suitable types of graphical indicators.

As another illustrative example, selection of a layer in section 702 may cause a window or some other graphical user interface element to be shown in display 700 with the information for the entry in table 602 that corresponds to the selected layer. This window, or graphic user interface element, also could be shown when a pointer is moved over a layer or remains over a layer for some selected period of time.

Although the information in FIGS. 5, 6, and 7 are illustrated as different displays, this information may be presented in a single display that may be continuous. For example, the information may be displayed as a single webpage or document.

Figure 8:
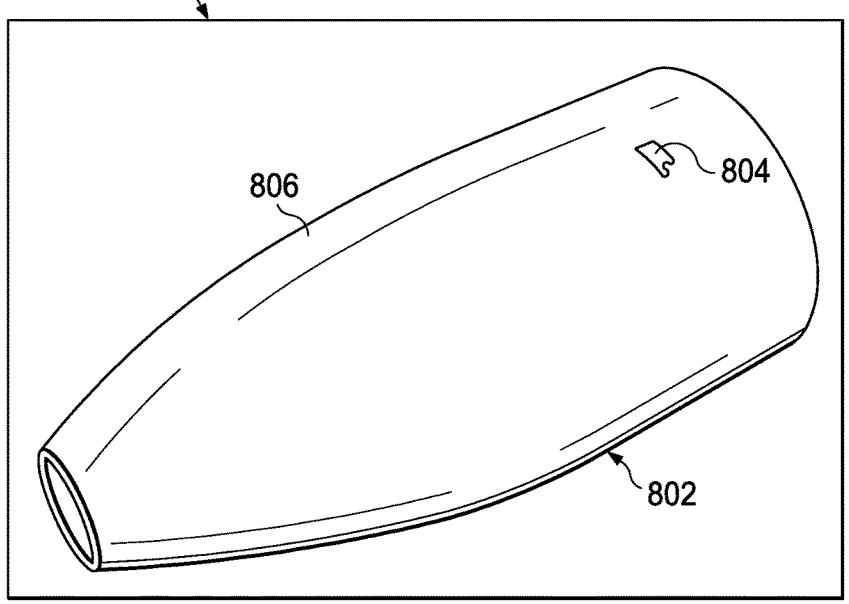
FIG. 8 is an illustration of a section in an aft section of fuselage skin in accordance with an illustrative embodiment.

With reference now to FIG. 8, an illustration of a section in an aft section of fuselage skin is depicted in accordance with an illustrative embodiment. In this illustrative example, display 800 is an example of the display in graphical user interface 410 for client 400 in FIG. 4.

In this illustrative example, fuselage skin 802 is displayed. In this illustrative example, section 804 can be seen on surface 806 of fuselage skin 802. Fuselage skin 802 and display 800 also may be manipulated by a user in a similar fashion to skin panel 502 in FIG. 5.

With reference now to FIG. 9, an illustration of information for layers of composite material is depicted in accordance with an illustrative embodiment. In this illustrative example, display 900 is an example of a display in graphical user interface 410 in FIG. 4.

In this illustrative example, display 900 includes table 902. Table 902 is an example of layup information 424 in FIG. 4. Table 902 identifies layers for section 804 of fuselage skin 802 in FIG. 8.

In this illustrative example, column 904 is a name for a layer in the number of layers in section 804. Column 906 identifies a material for the layer. Column 908 identifies a thickness for the layer, column 910 identifies an orientation for the column, and column 912 identifies a sequence for the layer. Column 914 is a rosette name for the layer.

Figure 10:
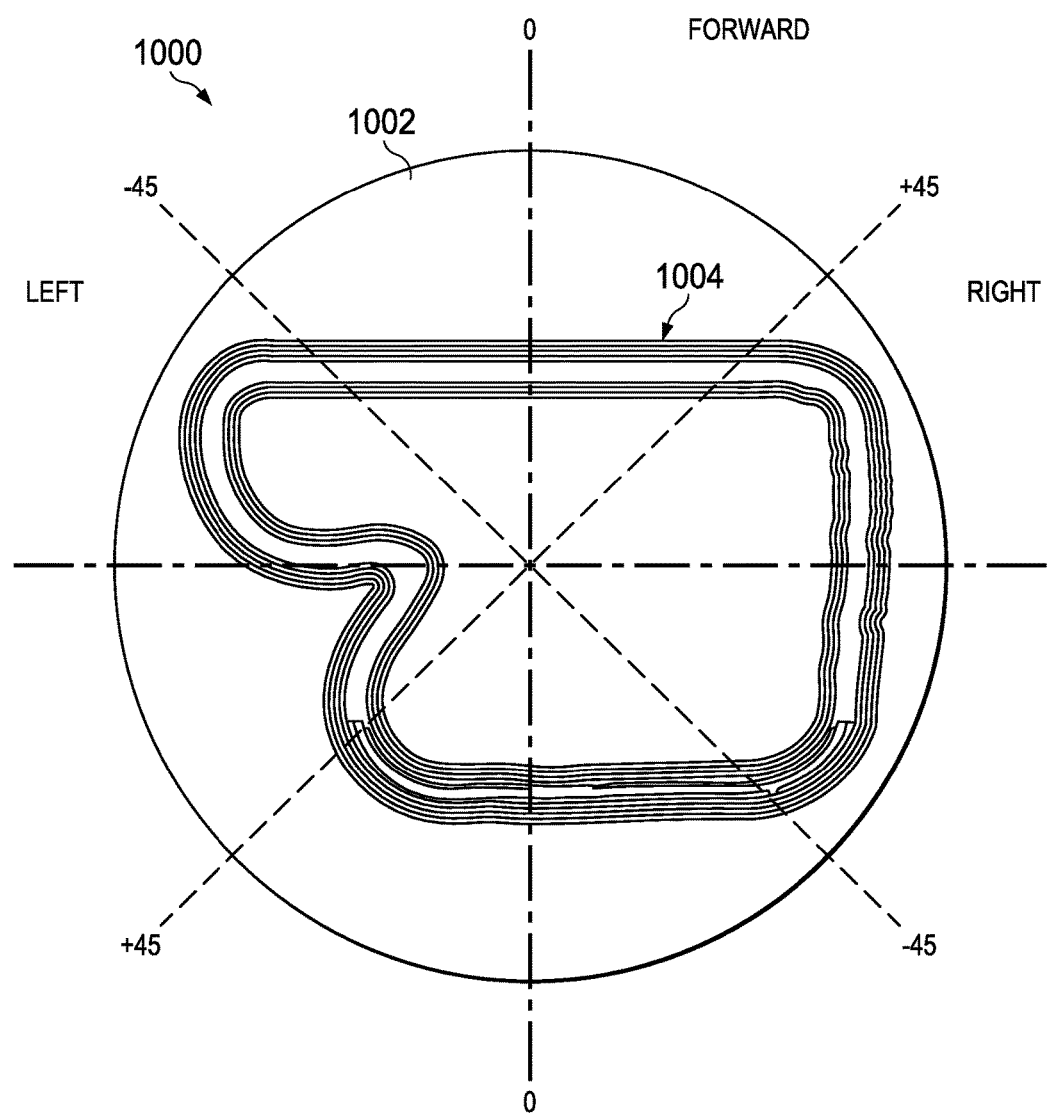
FIG. 10 is a two-dimensional top view of a section of fuselage skin in accordance with an illustrative embodiment.

In FIG. 10, a two-dimensional top view of a section in a fuselage skin is depicted in accordance with an illustrative embodiment. In this illustrative example, display 1000 is an example of a display in graphical user interface 410 in FIG. 4. In this example, section 1002 is a two-dimensional top view of section 804 in FIG. 8. In this example, section 1002 is seen as a top view from surface 806 of fuselage skin 802 in FIG. 8. Section 1002 may take into account a structure that may be located in fuselage skin 802. As can be seen in this illustrative example, section 1002 has irregular shape 1004. This situation may result in section 1002 having the irregular shape. Additionally, irregular shape 1004 may take into account the shape of the inconsistency to be reworked.

Figure 11:
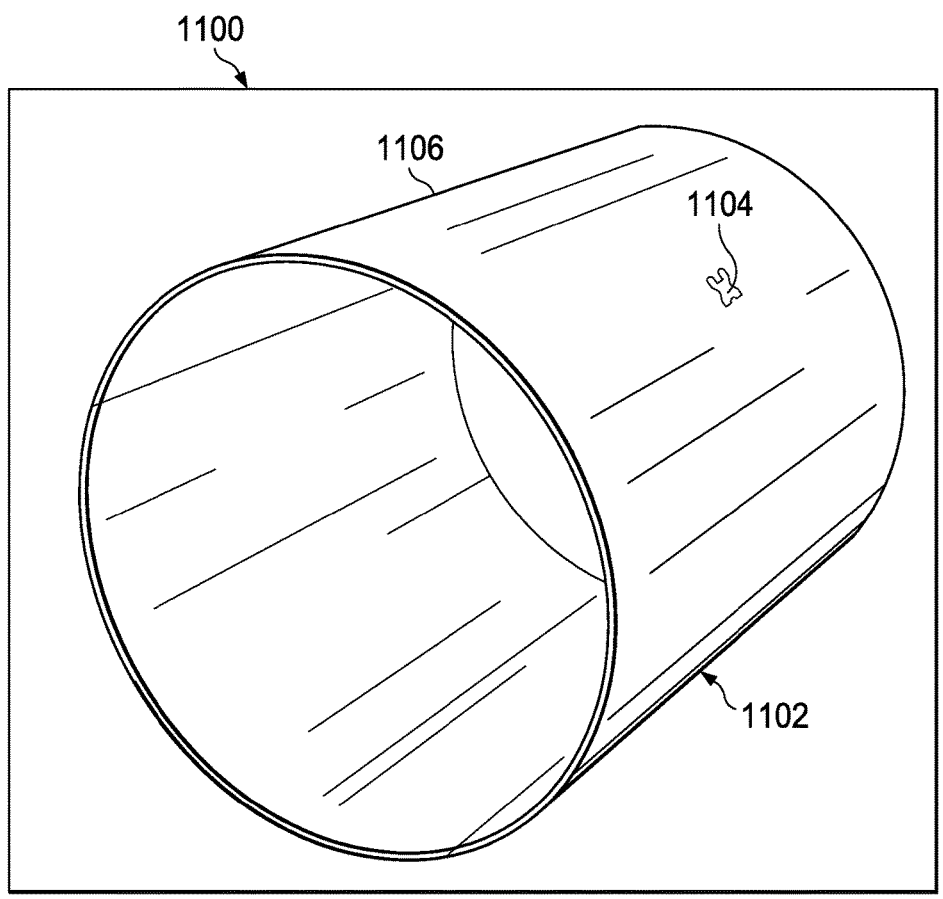
FIG. 11 is an illustration of a section in the middle portion of a fuselage skin in accordance with an illustrative embodiment.

With reference now to FIG. 11, an illustration of a section in the middle portion of a fuselage skin is depicted in accordance with an illustrative embodiment. In this illustrative example, display 1100 is an example of a display in graphical user interface 410 for client 400 in FIG. 4. In this illustrative example, fuselage skin 1102 is displayed in display 1100. Section 1104 is seen on surface 1106 of fuselage skin 1102 in this illustrative example. In a similar fashion, fuselage skin 1102 also may be manipulated by a user in a fashion similar to skin panel 502 in FIG. 5 and fuselage skin 802 in FIG. 8.

With reference now to FIG. 12, an illustration of a display of layup information for layers of composite material in a fuselage is depicted in accordance with an illustrative embodiment. In this illustrative example, display 1200 is an example of a display in graphical user interface 410 for client 400 in FIG. 4.

In this example, table 1202 is present in display 1200. Table 1202 is an example of layup information 424 in FIG. 4. Column 1204 identifies the name of the layer, and column 1206 identifies a material for the layer. Column 1208 identifies a thickness for the layer, column 1210 identifies an orientation for the layer, and column 1212 identifies a sequence for the layer. Column 1214 includes a rosette name for each of the entries.

Figure 13:
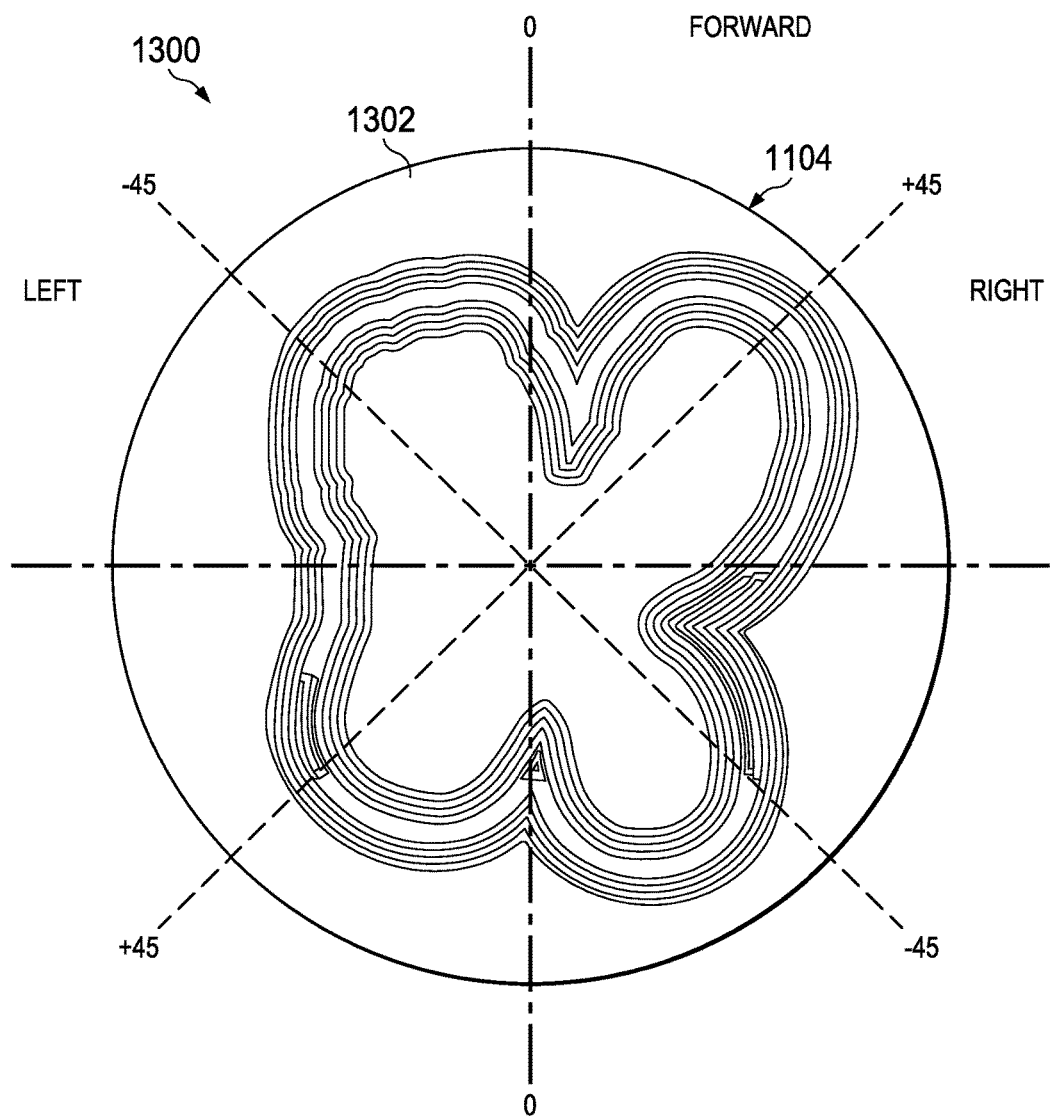
FIG. 13 is an illustration of a two-dimensional top view of a section of fuselage skin in accordance with an illustrative embodiment.

With reference now to FIG. 13, an illustration of a two-dimensional top view of a section in a fuselage skin is depicted in accordance with an illustrative embodiment. In this illustrative example, display 1300 is an example of the display in graphical user interface 410 for client 400 in FIG. 4. Section 1302 is seen in display 1300. Section 1302 is a two-dimensional top view of section 1104 on surface 1106 of fuselage skin 1102 in FIG. 11. Section 1302 also has an irregular shape.

The illustration of three-dimensional models, layup information for layers of composite material, and two-dimensional top views are presented for purposes of illustration for an illustrative embodiment and are not meant to imply limitations to the manner in which information from a template may be displayed to a user. In still other illustrative examples, other information may be displayed in addition to and/or in place of the information in these illustrative examples. For example, a model of the patch may be displayed. In still other illustrative examples, the materials removed to form the section also may be shown.

As another example, in some illustrative embodiments, cross-sectional side views may also be included in the displays in addition to the three-dimensional views, the two-dimensional views, and the tables illustrated in the examples above. These cross-sectional side views may include additional information about the section and the patch that may be placed in the section. For example, a cross-sectional side view may be included that provides layers that correspond to layers illustrated in table 602 in FIG. 6, table 902 in FIG. 9, and table 1202 in FIG. 12. These cross-sectional views may correspond to different cross-sections taken of the two-dimensional top views. More than one cross-sectional view may be present, depending on the shape of the perimeter for each of the sections.

Although the different examples in FIGS. 5-13 illustrate information for a skin panel on a wing and different parts of a fuselage skin, these different illustrative embodiments can be applied to other structures. These structures may include, for example, a frame in a fuselage, a bulk head, and/or other structures in an aircraft.

Figure 14:
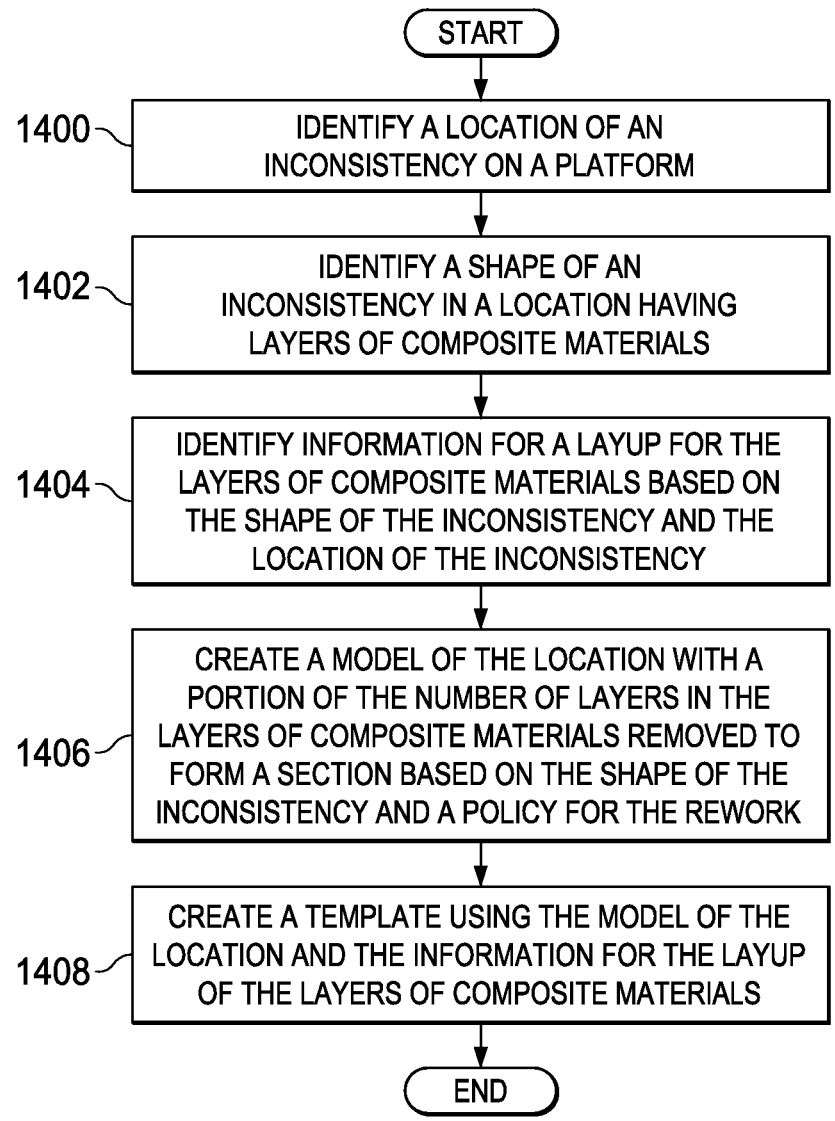
FIG. 14 is an illustration of a flowchart of a process for processing an inconsistency in accordance with an illustrative embodiment.

With reference now to FIG. 14, an illustration of a flowchart of a process for processing an inconsistency is depicted in accordance with an illustrative embodiment. This process may be implemented in computer system 336 and, in particular, the process may be performed by rework tool 340 in FIG. 3.

The process begins by identifying a location of an inconsistency on a platform (operation 1400). The identification in operation 1400 may be made through receiving user input 408 in graphical user interface 410 in FIG. 4 in these illustrative examples. The process then identifies a shape of an inconsistency in a location having layers of composite materials (operation 1402). A shape also may be identified through user input 408 entered into graphical user interface 410 in these illustrative examples.

The process then identifies information for a layup for the layers of composite materials based on the shape of the inconsistency and the location of the inconsistency (operation 1404). In operation 1404, this information may be obtained from a cad bottle of the platform, a database of layup information used to manufacture the platform, and/or other suitable types of information. This information may be in different locations. Rework tool 340 may send requests to receive or access this information.

The process then creates a model of the location with a portion of the number of layers in the layers of composite materials removed to form a section based on the shape of the inconsistency and a policy for the rework (operation 1406). In the illustrative examples, this policy may be, for example, policy 356 in FIG. 3.

Additionally, in creating the model, policy 356 may take into account structures that may be associated with the location. Some of these structures may affect the shape or configuration of the perimeter defining the area for a portion of a layer in the number of layers. Further, the configuration of the perimeter and the area of each layer that is removed to form the section also may be customized for the shape of a particular inconsistency.

The process creates a template using the model of the location and the information for the layup of the layers of composite materials (operation 1408). The template created in operation 1408 may be displayed to a user in displays, such as the displays in FIGS. 5-13. The process terminates thereafter.

In creating the model of the location, in addition to forming a section based on the shape of the inconsistency, rework tool 340 also may include a patch for bonding to the section in the model. Also, the portion of the number of layers removed to form the section also may be included in the model. In some illustrative examples, rather than including the patch in the portion of the number of layers of composite materials removed, these structures may be placed in separate models, depending on the particular implementation.

Figure 15:
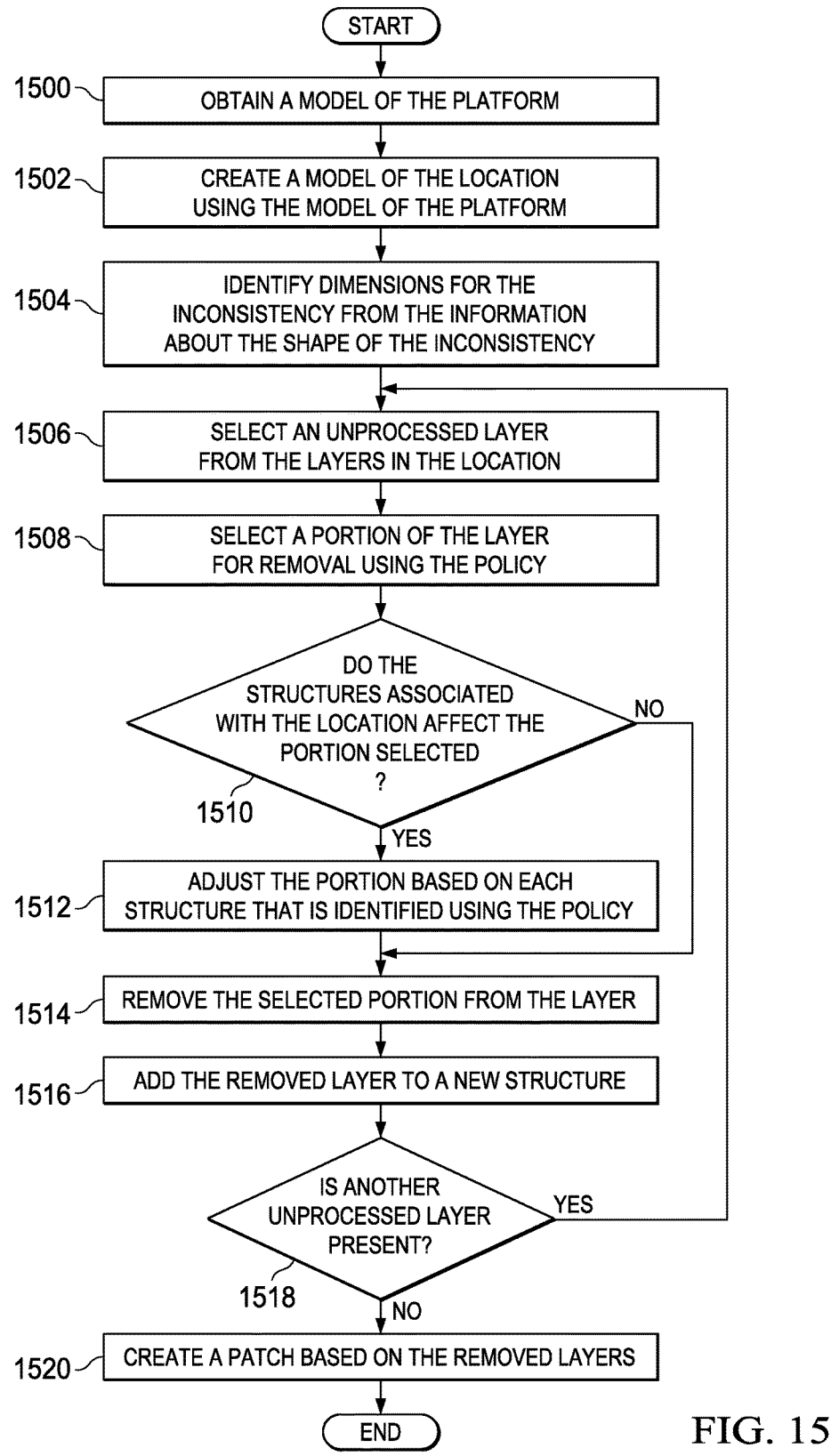
FIG. 15 is an illustration of a flowchart of a process for creating a model of a location with a section removed for an inconsistency in accordance with an illustrative embodiment.

With reference now to FIG. 15, an illustration of a flowchart of a process for creating a model of a location with a section removed for an inconsistency is depicted in accordance with an illustrative embodiment. The process illustrated in FIG. 15 is an example of one manner in which operation 1406 in FIG. 14 may be implemented.

In these illustrative examples, the different operations in FIG. 15 may be performed directly by rework tool 340 in FIG. 3 or by rework tool 340 sending requests to another application, such as a computer aided design system.

The process begins by obtaining a model of the platform (operation 1500). The process then creates a model of the location using the model of the platform (operation 1502). The model of the location may be created by selecting a section of a model of the platform. This section is a three-dimensional section in these illustrative examples. This section includes the location of the inconsistency. The model created in operation 1502 may be used to create template 362 in these illustrative examples.

The process identifies dimensions for the inconsistency from the information about the shape of the inconsistency (operation 1504). The dimensions may be identified from user input providing the information about the shape of the inconsistency. This information may take the form of the dimensions being entered by the user, pictures, drawings, or other suitable information. For example, a picture of the inconsistency may be processed to identify dimensions for the inconsistency.

The process then selects an unprocessed layer from the layers in the location (operation 1506). The process then selects a portion of the layer for removal using the policy (operation 1508). This policy includes rules to identify the area that the portion encompasses, as well as the shape or configuration of the perimeter that defines the area.

In some cases, the selected portion of the layer for removal may include not removing any portion of the layer. For example, if the location at which the inconsistency is located has about 70 layers, the policy may only require removing some portion of those layers rather than all of the layers forming the section.

A determination is made as to whether structures associated with the location affect the portion selected (operation 1510). If one or more structures is present in the location that affects the portion selected for removal from a layer, the process adjusts the portion based on each structure that is identified using the policy (operation 1512). The policy may provide rules on adjustments to the portion that is selected for removal from a layer based on the structure location, shape, and other suitable information.

Next, the process removes the selected portion from the layer (operation 1514). The process then adds the removed layer to a new structure (operation 1516). This new structure in the model represents a structure comprised of the portions of the layers that are removed to form the section.

A determination is made as to whether another unprocessed layer is present (operation 1518). If another unprocessed layer is present, the process returns to operation 1506 to select another unprocessed layer.

Otherwise, the process creates a patch based on the removed layers (operation 1520). In operation 1520, this patch may be created using a standard or pre-defined model. In some cases, operation 1520 may involve creating a patch based on the structure formed in operation 1516. The creation of a patch in operation 1520 may be the same as the structure or may have different types of layers with the same general shape, depending on the particular implementation. The process terminates thereafter.

With reference again to operation 1510, if the structures associated with the location do not affect the portion selected, the process proceeds to operation 1514 as described above.

Figure 16:
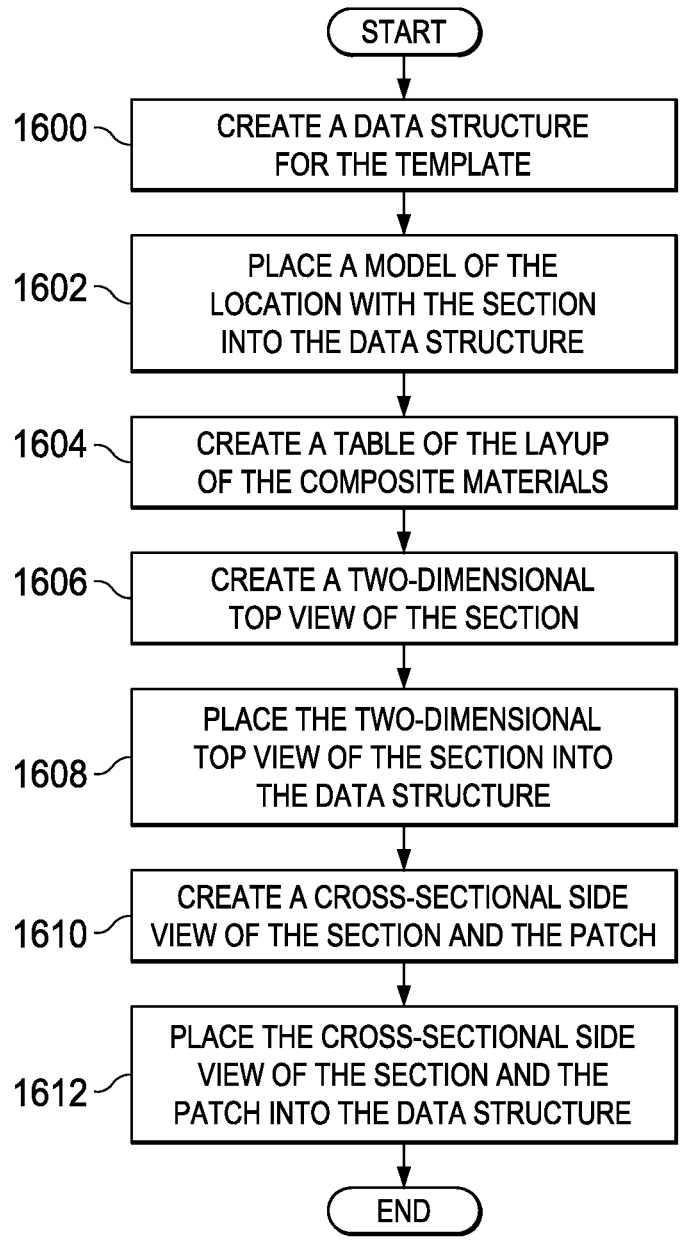
FIG. 16 is an illustration of a flowchart of a process for creating a template in accordance with an illustrative embodiment.

With reference now to FIG. 16, an illustration of a flowchart of a process for creating a template is depicted in accordance with an illustrative embodiment. The process illustrated in FIG. 16 is an example of one manner in which operation 1408 in FIG. 14 may be implemented.

The process begins by creating a data structure for the template (operation 1600). This data structure may take different forms, depending on the particular implementation. For example, the data structure may be a portable document format file, a light-weight viewer document format for a computer aided design application, a computer aided design application file, or some other suitable type of data structure.

The process places a model of the location with the section into the data structure (operation 1602). The model placed into the data structure in operation 1602 may be a model similar to those displayed in a display in FIGS. 5, 8, and 11.

This model also may include the patch that is to be bonded to the section that is to be created at the location in which the inconsistency is present. Additionally, this model may include the portions of the layers of composite materials removed to form the section. In placing the model into the data structure, the model may be reformatted for use in the particular data structure.

Next, the process creates a table of the layup of the composite materials (operation 1604). This table, may be, for example, without limitation, tables such as those illustrated in FIGS. 6, 9, and 12.

A two-dimensional top view of the section is created (operation 1606). This two-dimensional top view may be similar to the ones displayed in FIGS. 7, 10, and 13. The two-dimensional top view of the section is placed into the data structure (operation 1608). Thereafter, a cross-sectional side view of the section and the patch is created (operation 1610). This cross-sectional side view may be created using the model of the location and the patch. The cross-sectional side view of the section and the patch are then placed into the data structure (operation 1612), with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, operation 1516 and operation 1520 may be omitted from the flowchart in FIG. 15. These operations may be omitted when only the section is desired in the model. As another example, rather than placing a particular piece of information into the data structure each time the information is created, all of the information may be placed into the data structure as a final step. Further, depending on the particular implementation, some of the operations may be processed in parallel if multi-tasking or multiple computers are present for performing the different operations.

Turning now to FIG. 17, an illustration of a data processing system is depicted in accordance with an illustrative embodiment. In this illustrative example, data processing system 1700 includes communications fabric 1702, which provides communications between processor unit 1704, memory 1706, persistent storage 1708, communications unit 1710, input/output (I/O) unit 1712, and display 1714. Data processing system 1700 is an example of a data processing system that may be used to implement one or more computers in number of computers 338 in computer system 336.

Processor unit 1704 serves to execute instructions for software that may be loaded into memory 1706. Processor unit 1704 may be a number of processors, a multi-processor core, or some other type of processor, depending on the particular implementation. A number, as used herein with reference to an item, means one or more items. Further, processor unit 1704 may be implemented using a number of heterogeneous processor systems in which a main processor is present with secondary processors on a single chip. As another illustrative example, processor unit 1704 may be a symmetric multi-processor system containing multiple processors of the same type.

Memory 1706 and persistent storage 1708 are examples of storage devices 1716. A storage device is any piece of hardware that is capable of storing information, such as, for example, without limitation, data, program code in functional form, and/or other suitable information either on a temporary basis and/or a permanent basis. Storage devices 1716 may also be referred to as computer readable storage devices in these examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these examples, provides for communications with other data processing systems or devices. In these examples, communications unit 1710 is a network interface card. Communications unit 1710 may provide communications through the use of either or both physical and wireless communications links.

Input/output unit 1712 allows for input and output of data with other devices that may be connected to data processing system 1700. For example, input/output unit 1712 may provide a connection for user input through a keyboard, a mouse, and/or some other suitable input device. Further, input/output unit 1712 may send output to a printer. Display 1714 provides a mechanism to display information to a user.

Instructions for the operating system, applications, and/or programs may be located in storage devices 1716, which are in communication with processor unit 1704 through communications fabric 1702. In these illustrative examples, the instructions are in a functional form on persistent storage 1708. These instructions may be loaded into memory 1706 for execution by processor unit 1704. The processes of the different embodiments may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these examples. In one example, computer readable media 1720 may be computer readable storage media 1724 or computer readable signal media 1726.

Computer readable storage media 1724 may include, for example, an optical or magnetic disk that is inserted or placed into a drive or other device that is part of persistent storage 1708 for transfer onto a storage device, such as a hard drive, that is part of persistent storage 1708. Computer readable storage media 1724 also may take the form of a persistent storage, such as a hard drive, a thumb drive, or a flash memory, that is connected to data processing system 1700. In some instances, computer readable storage media 1724 may not be removable from data processing system 1700.

In these examples, computer readable storage media 1724 is a physical or tangible storage device used to store program code 1718 rather than a medium that propagates or transmits program code 1718. Computer readable storage media 1724 is also referred to as a computer readable tangible storage device or a computer readable physical storage device. In other words, computer readable storage media 1724 is a media that can be touched by a person.

Alternatively, program code 1718 may be transferred to data processing system 1700 using computer readable signal media 1726. Computer readable signal media 1726 may be, for example, a propagated data signal containing program code 1718. For example, computer readable signal media 1726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1718 may be downloaded over a network to persistent storage 1708 from another device or data processing system through computer readable signal media 1726 for use within data processing system 1700. For instance, program code stored in a computer readable storage medium in a server data processing system may be downloaded over a network from the server to data processing system 1700. The data processing system providing program code 1718 may be a server computer, a client computer, or some other device capable of storing and transmitting program code 1718.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1704 may take the form of a hardware unit that has circuits that are manufactured or configured for a particular use. This type of hardware may perform operations without needing program code to be loaded into a memory from a storage device to be configured to perform the operations.

For example, when processor unit 1704 takes the form of a hardware unit, processor unit 1704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and/or other suitable hardware devices. With this type of implementation, program code 1718 may be omitted, because the processes for the different embodiments are implemented in a hardware unit.

In still another illustrative example, processor unit 1704 may be implemented using a combination of processors found in computers and hardware units. Processor unit 1704 may have a number of hardware units and a number of processors that are configured to run program code 1718. With this depicted example, some of the processes may be implemented in the number of hardware units, while other processes may be implemented in the number of processors.

In another example, a bus system may be used to implement communications fabric 1702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1706, or a cache, such as found in an interface and memory controller hub that may be present in communications fabric 1702.

Thus, the different illustrative embodiments provide a method and apparatus for processing an inconsistency. With an illustrative embodiment, a shape of the inconsistency is identified in the location having layers of composite materials. Information for a layup of the layers of composite materials is identified based on the shape of the inconsistency and the location of the inconsistency. A model of the location with a portion of the number of layers in the layers of composite material removed to form a section based on the shape of the inconsistency in a policy for rework is created.

With the different illustrative embodiments, a model of a section and information about the layup of the layers of composite materials in that location in which the section is present may be generated. This information may be created without requiring a user to search for information in various locations. Further, the creation of the section is based on the policy for rework. With the policy, the section may be an irregular shape rather than some standard shape that may be selected to encompass the inconsistency.

With these and other features in an illustrative embodiment, processing an inconsistency may take less time and expense. Time may be saved in identifying the layup of the materials and creating a section that is tailored to the shape of the inconsistency and a policy for performing rework on the inconsistency.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing an inconsistency, the method comprising:
 a computer identifying a shape of the inconsistency in a location having layers of composite materials;
 the computer creating a model of the location with a portion of a number of layers in the layers of composite materials removed to form a section based on the shape of the inconsistency and a policy for rework, wherein the policy provides for a variable scarf ratio within the section, and wherein the section comprises at least a first part having a first scarf ratio and a second part having a second scarf ratio, different from the first scarf ratio; and
 displaying, on a display device, the layers in a table, the table having:

rows identifying corresponding ones of the layers of composite materials;
a first column identifying a name of a corresponding layer;
a second column next to the first column, the second column identifying a material of the corresponding layer;
a third column next to the second column, the third column identifying a thickness of the corresponding layer;
a fourth column next to the third column, the fourth column identifying an orientation of the corresponding layer;
a fifth column next to the fourth column, the fifth column identifying a sequence of the corresponding layer relative to other layers; and
a sixth column next to the fifth column, the sixth column identifying a rosette name of the corresponding layer, the rosette name being an identification of an axis system for the corresponding layer.

2. The method of claim 1 wherein the policy includes rules generated from at least one of regulations of a government, a regulatory authority, and guidelines from a manufacturer of an aircraft which is composed of the composite materials.

3. The method of claim 2 further comprising:
the computer forming a template using the model, wherein the template comprises at least one of a three-dimensional model of the location with the portion of the number of layers in the layers of composite materials removed to form the section, a two-dimensional top view of the section, layup information for the number of layers, a model of a patch for bonding in the section, and a model of the portion of the number of layers in the layers of composite materials removed to form the section.

4. The method of claim 3 further comprising:
the computer performing the rework on the inconsistency using the template.

5. The method of claim 1, wherein the shape comprises at least one of dimensions for the inconsistency, a depth of the inconsistency, a size of the inconsistency, and an orientation of the inconsistency.

6. The method of claim 1 further comprising:
the computer creating a patch for bonding in the section.

7. The method of claim 6, wherein the patch is a virtual patch in the model.

8. The method of claim 1, wherein the step of creating the model of the location with the portion of the number of layers in the layers of composite materials removed to form the section based on the shape of the inconsistency and the policy for the rework comprises:
the computer creating a three-dimensional model of the location with the portion of the number of layers in the layers of composite materials removed to form the section based on the shape of the inconsistency and the policy for the rework.

9. The method of claim 8, wherein the three-dimensional model includes the portion as a separate object.

10. The method of claim 1, wherein the step of creating the model of the location with the portion of the number of layers in the layers of composite materials removed to form the section based on the shape of the inconsistency and the policy for the rework comprises:
the computer creating a two-dimensional top view of the section.

11. The method of claim 1, wherein the step of creating the model of the location with the portion of the number of layers in the layers of composite materials removed to form the section based on the shape of the inconsistency and the policy for the rework comprises:
the computer creating a three-dimensional model of the layers of composite materials at the location; and
the computer removing the portion of the number of layers in the layers of composite materials in the three-dimensional model to form the section to form the model of the location with the portion of the number of layers in the layers of composite materials removed.

12. An apparatus comprising:
a processor;
a memory in communication with the processor;
an application stored in the memory, in communication with the processor and configured to identify a shape of an inconsistency in a location having layers of composite materials and create a model of the location with a portion of a number of layers in the layers of composite materials removed to form a section based on the shape of the inconsistency and a policy for rework, wherein the policy provides for a variable scarf ratio within the section, and wherein the section comprises at least a first part having a first scarf ratio and a second part having a second scarf ratio, different from the first scarf ratio; and
a display device in communication with the processor, and wherein the application is further configured, when executed by the processor, to display on the display device the layers in a table, the table having:
rows identifying corresponding ones of the layers of composite materials;
a first column identifying a name of a corresponding layer;
a second column next to the first column, the second column identifying a material of the corresponding layer;
a third column next to the second column, the third column identifying a thickness of the corresponding layer;
a fourth column next to the third column, the fourth column identifying an orientation of the corresponding layer;
a fifth column next to the fourth column, the fifth column identifying a sequence of the corresponding layer relative to other layers; and
a sixth column next to the fifth column, the sixth column identifying a rosette name of the corresponding layer, the rosette name being an identification of an axis system for the corresponding layer.

13. The apparatus of claim 12, wherein the policy includes rules generated from at least one of regulations of a government, a regulatory authority, and guidelines from a manufacturer of an aircraft which is composed of the composite materials.

14. The apparatus of claim 13, wherein the application is further configured to form a template using the model, wherein the template comprises at least one of a three-dimensional model of the location with the portion of the number of layers in the layers of composite materials removed to form the section, a two-dimensional top view of the section, layup information for the number of layers, a model of a patch for bonding in the section, and a model of the portion of the number of layers in the layers of composite materials removed to form the section.

15. The apparatus of claim 13, wherein in being configured to create the model of the location with the portion of the number of layers in the layers of composite materials removed to form the section based on the shape of the inconsistency and the policy for the rework, the application is configured to create a three-dimensional model of the location with the portion of the number of layers in the layers of composite materials removed to form the section based on the shape of the inconsistency and the policy for rework.

16. The apparatus of claim 12, wherein in being configured to create the model of the location with the portion of the number of layers in the layers of composite materials removed to form the section based on the shape of the inconsistency and the policy for the rework, the application is configured to create a three-dimensional model of the layers of composite materials at the location; and remove the portion of the number of layers in the layers of composite materials in the three-dimensional model to form the section to form the model of the location with the portion of the number of layers in the layers of composite materials removed.

17. The apparatus of claim 13 further comprising:
a client, on the processor, configured to receive the information about the inconsistency;
a computer aided design system configured to access the information about the layup for the number of layers in the layers of composite materials and process models; and
a rework module, on the processor, configured to identify the information for the layup for the number of layers in the layers of composite materials based on dimensions of the inconsistency and the location of the inconsistency; and create the model of the location with the portion of the number of layers in the layers of composite materials removed to form the section based on the shape of the inconsistency and the policy for the rework.

18. A computer program product comprising:
a non-transitory computer readable storage medium;
first program code for identifying a shape of an inconsistency in a location having layers of composite materials;
second program code for creating a model of the location with a portion of a number of layers in the layers of composite materials removed to form a section based on the shape of the inconsistency and a policy for rework, wherein the first program code and the second program code are stored on the computer readable storage medium, wherein the section comprises at least a first part having a first scarf ratio and a second part having a second scarf ratio, different from the first scarf ratio, and wherein the policy includes rules generated from at least one of regulations of a government, a regulatory authority, and guidelines from a manufacturer of an aircraft which is composed of the composite materials; and
third program code for displaying, on a display device, the layers in a table, the table having:
rows identifying corresponding ones of the layers of composite materials;
a first column identifying a name of a corresponding layer;
a second column next to the first column, the second column identifying a material of the corresponding layer;
a third column next to the second column, the third column identifying a thickness of the corresponding layer;
a fourth column next to the third column, the fourth column identifying an orientation of the corresponding layer;
a fifth column next to the fourth column, the fifth column identifying a sequence of the corresponding layer relative to other layers; and
a sixth column next to the fifth column, the sixth column identifying a rosette name of the corresponding layer, the rosette name being an identification of an axis system for the corresponding layer.

\* \* \* \* \*